(12) United States Patent
Paxton et al.

(10) Patent No.: US 10,238,089 B1
(45) Date of Patent: Mar. 26, 2019

(54) DOG BOOT WITH LINER HAVING INTEGRAL PROTRUDING CUSHIONING PAD

(71) Applicants: Stephen E. Paxton, Brainerd, MN (US); Lisa M. Lugo-Paxton, Brainerd, MN (US)

(72) Inventors: Stephen E. Paxton, Brainerd, MN (US); Lisa M. Lugo-Paxton, Brainerd, MN (US)

(73) Assignee: Hyper Pet Brands LLC, Wayne, PA (US)

( * ) Notice: Subject to any disclaimer, the term of this patent is extended or adjusted under 35 U.S.C. 154(b) by 0 days.

(21) Appl. No.: 15/955,642

(22) Filed: Apr. 17, 2018

Related U.S. Application Data

(63) Continuation-in-part of application No. 15/802,316, filed on Nov. 2, 2017, now Pat. No. 9,943,065, which is a continuation of application No. 15/497,187, filed on Apr. 25, 2017, now abandoned, which is a continuation-in-part of application No. 15/359,502, filed on Nov. 22, 2016, now Pat. No. 9,629,336, which is a continuation-in-part of application No. 13/396,595, filed on Feb. 14, 2012, now Pat. No. 9,497,932, which is a continuation of application No. 12/719,847, filed on Mar. 8, 2010, now Pat. No. 8,113,152, which is a continuation-in-part of application No. 10/980,085, filed on Nov. 2, 2004, now Pat. No. 7,971,557.

(60) Provisional application No. 60/517,112, filed on Nov. 3, 2003.

(51) Int. Cl.
*A01K 13/00* (2006.01)

(52) U.S. Cl.
CPC .................. *A01K 13/007* (2013.01)

(58) Field of Classification Search
CPC ...... A01K 13/007; A01K 13/006; A43B 5/00; A43B 23/26; A43B 5/0401; A43B 5/0433; A43B 7/20; A01L 9/00
See application file for complete search history.

(56) References Cited

U.S. PATENT DOCUMENTS

| 2,651,853 A | * | 9/1953 | Lewis | A01K 13/007 36/111 |
| 4,938,753 A | * | 7/1990 | Van Gompel | A61F 13/49015 604/385.29 |
| 5,211,672 A | * | 5/1993 | Andujar | A43B 5/00 36/106 |
| 5,385,036 A | * | 1/1995 | Spillane | A43B 1/04 2/16 |
| 5,408,812 A | * | 4/1995 | Stark | A01K 13/007 119/850 |
| 5,452,685 A | * | 9/1995 | Thomas | A01K 13/007 119/850 |

(Continued)

*Primary Examiner* — Valentina Xavier
(74) *Attorney, Agent, or Firm* — Albert W. Watkins (57) ABSTRACT

A dog boot is fabricated using a breathable substrate, preferably of durable material such as heavy nylon. Onto the substrate, various friction pads, wear pads, tensioning straps, and strategically located cushioning pads are attached. Specially configured slits ensure that a wide range of leg sizes relative to paw sizes may be accommodated, while easing application of the boot and eliminating any risk of bunching. In some embodiments, a liner is fabricated that incorporates a friction pad. The liner may be removable or permanently affixed.

7 Claims, 7 Drawing Sheets

(56) References Cited

U.S. PATENT DOCUMENTS

| | | | | |
|---|---|---|---|---|
| 5,490,337 | A | * | 2/1996 | Zerbinati .............. A43B 5/0415 36/117.7 |
| 5,495,828 | A | * | 3/1996 | Solomon .............. A01K 13/007 119/850 |
| 5,813,144 | A | * | 9/1998 | Prengler .................. A43B 5/00 36/138 |
| 5,983,526 | A | * | 11/1999 | Pawlik ..................... A43B 3/18 36/51 |
| 6,526,920 | B1 | * | 3/2003 | Griffin ................. A01K 13/007 119/850 |
| 7,971,557 | B2 | * | 7/2011 | Paxton ................. A01K 13/006 119/850 |
| 8,176,880 | B2 | * | 5/2012 | Hurwitz ................... A61D 9/00 119/850 |
| 2003/0115777 | A1 | * | 6/2003 | Hall ..................... A43B 3/0031 36/117.6 |
| 2005/0188925 | A1 | * | 9/2005 | Yun ...................... A01K 13/007 119/850 |
| 2006/0207296 | A1 | * | 9/2006 | Fujikawa ............. A47C 31/006 66/202 |
| 2009/0012490 | A1 | * | 1/2009 | Winqvist ............ A61F 13/5633 604/385.03 |
| 2010/0211034 | A1 | * | 8/2010 | Fish ....................... A01N 25/34 604/359 |
| 2010/0247846 | A1 | * | 9/2010 | Erickson ................ B32B 5/022 428/99 |
| 2012/0010584 | A1 | * | 1/2012 | Schmidt ............. A61F 13/0226 604/372 |

\* cited by examiner

DOG BOOT WITH LINER HAVING INTEGRAL PROTRUDING CUSHIONING PAD

CROSS REFERENCE TO RELATED APPLICATIONS

This application is a Continuation of U.S. utility application Ser. No. 15/497,187 herewith, filed Apr. 25, 2017 and granting on Apr. 17, 2018 as U.S. Pat. No. 9,943,065, which is a Continuation-In-Part of U.S. utility application Ser. No. 15/359,502 filed Nov. 22, 2016 and granted as U.S. Pat. No. 9,629,336 on Apr. 25, 2017, which is a Continuation-In-Part of United States utility application Ser. No. 13/396,595 filed Feb. 14, 2012 and granted as U.S. Pat. No. 9,497,932 on Nov. 22, 2016, which is a Continuation of United States utility application Ser. No. 12/719,847 filed Mar. 8, 2010 and granted as U.S. Pat. No. 8,113,152 on Feb. 14, 2012, which is in turn a Continuation-In-Part of U.S. utility application Ser. No. 10/980,085 filed Nov. 2, 2004 and granted as U.S. Pat. No. 7,971,557 on Jul. 5, 2011, which in turn claims priority to U.S. provisional application Ser. No. 60/517,112 filed Nov. 3, 2003, each naming the present inventors, the contents of each which are incorporated herein by reference in entirety.

BACKGROUND OF THE INVENTION

1. Field of the Invention

This invention pertains generally to the field of animal husbandry, and more particularly to protective dog boots.

2. Description of the Related Art

Dogs have long been known as "man's best friend". These animals serve very diverse functions, providing companionship, guarding, towing, hunting, and even sensory conversion, such as a seeing eye-dog, a hearing-assist dog, and even a police or military dog. Regardless of the relationship between person and dog, at various times and for many diverse reasons it may be highly desirable for the dog owner to place boots upon the dog's paws. For example, in inclement weather a person may not wish to try to clean a dog's paws after the dog has been outside. Boots that may be placed and then readily removed may be much easier to use than what might be required to thoroughly clean the dog's feet. In other instances, a dog may have injured one or more paws and so may not have the usual toughness. In such case, a suitable boot may help to protect the affected paw until sufficient healing has occurred to no longer require the boot. In other cases, the dog's pads may be inadequate for traversing the ground when temperatures are particularly severe, such as in colder climates or with dogs that are not adapted to the cold, or conversely in extremely hot climates where the ground surface may be scorching. Racing and sled dogs may be exposed to a particularly harsh course or environment, and so may also need special protection. Boots can be used to prevent snow from getting up between the pads of the foot, freezing, abrading the soft tissue, and thereby producing a lame dog.

A number of artisans have recognized one or more of the foregoing needs, and so have designed various dog boots. One such patent which exemplifies these known boots is U.S. Pat. No. 6,526,920 by Griffin, entitled "Dog boot for hunting and other outdoor activities," the teachings which are incorporated herein by reference. This patent describes dog boots having a zipper and dual hook-and-loop leg fasteners with loops for tightening, and a non-skid sole. Additional patents that offer useful teachings and insights are incorporated by reference, including U.S. Pat. Des. 387,511 by Caditz; U.S. Pat. No. 5,495,828 by Solomon et al; U.S. Pat. No. 5,408,812 by Stark; U.S. Pat. No. 6,186,097 by Brockmann et al; Des. 379,251 by Mezey; U.S. Pat. No. 5,148,657 by Stafford et al; U.S. Pat. No. 5,452,685 by Thomas; U.S. Pat. No. 2,064,566 by Richman; U.S. Pat. No. 2,424,172 by Huddleston; U.S. Pat. No. 2,651,853 by Lewis; U.S. Pat. No. 3,762,073 by Cantales; U.S. Pat. Nos. 4,457,261 and 4,543,911 by Marshall; and U.S. Pat. No. 6,470,832 by Peacock.

However, these prior art boots tend to suffer from several common limitations. As may be recognized, prior art dog boots are often very difficult to put on the dog's foot. This problem will be intensified by the fact that most dogs will not remain still while a person is trying to put the boot on. Once on, these prior art boots do not stay on well. Many will simply spin about, potentially causing much discomfort or harm to the dog. Others will slide off as the dog walks or runs, much like loose socks coming off of a person walking on carpet. This phenomenon is quite significant, since the boot must be designed to be of non-slip material, or the dog will sprawl on finished wood, icy, or other relatively slippery surfaces. Yet, the boot must also preferentially stay on the dog's paw, rather than slide with respect thereto, even when the booted dog is traversing terrain having good traction. Simply applying more force about the dog's leg to keep the boot on has proven to be totally unsatisfactory, since circulation within the leg may become limited or disrupted. Unintended bunching of the boot top can be harder to detect, and can also restrict circulation. Yet, different dogs will have significantly different proportions between pad size and leg diameter, meaning that the boot must be very adjustable to accommodate different dog breeds and sizes. Finally, complex boots are not only more difficult to put on the dog, they are also much more expensive to produce, which is also undesirable.

SUMMARY OF THE INVENTION

In a first manifestation, the invention is a dog boot, suitable for insertion and removal of a dog paw and providing an operatively protective covering about the dog paw. The dog boot is fabricated from a generally tubular body member having a closed end and an open end. A pair of opposed slits are provided adjacent to the open end that define a first flare and a second flare and allow the first flare and the second flare to expand beyond a balance of the generally tubular body member, which facilitates insertion of a dog paw therein. A means is also provided adjacent the expanding means for contracting the open end from an open dog paw receiving position to a contracted dog paw retaining position. At least one cushion is located on an interior of the open end, and is affixed to a first one of the first and second flares and extends less than from a one of the pair of opposed slits to another of the pair of opposed slits when the open end is operatively contracted. The first and second flares overlap adjacent the open end when the open end is operatively contracted to the contracted dog paw retaining position. The first flare terminates prior to overlapping with the at least one cushion when the open end is operatively contracted to the contracted dog paw retaining position.

In a second manifestation, the invention is a dog boot suitable for insertion and removal of a dog's leg and paw and operatively providing protective covering about the dog paw. An operatively protective covering has a closed end and an open end and defines a dog paw region operative to surround the dog's paw, and defines a dog leg region operative to surround the dog's leg. The dog paw region is located adjacent to the closed end and has a ground engaging surface. The dog leg region is located adjacent to the open end. A means is provided for contracting the dog leg region. At least one interference-producing cushion has a foam core and an outer layer formed thereon. The at least one interference producing cushion is located on an interior of the dog leg region and protrudes interiorly from the operatively protective covering above and immediately adjacent to the dog paw region ground engaging surface, and is operative to produce interference with the dog's paw and thereby resist the dog leg region of the boot sliding into contact with the dog's paw.

OBJECTS OF THE INVENTION

Exemplary embodiments of the present invention solve inadequacies of the prior art by providing a breathable fabric substrate, preferably of durable material such as heavy nylon, onto which friction pads, wear pads, tensioning straps, and strategically located cushions are attached. Specially configured slits ensure that a wide range of leg sizes relative to paw sizes may be accommodated, while easing application of the boot and eliminating any risk of bunching during such application. The strategically located cushions are preferably provided in the form of a liner that is inserted and then securely affixed into the boot.

A first object of the invention is to provide a dog boot which is readily placed about a dog's paw. A second object of the invention is securement of the boot against slippage, spin or separation with respect to the dog's leg, while simultaneously substantially reducing the risk of circulatory disruption or harm to the dog. Another object of the present invention is to ensure that the boot will readily accommodate a wide range of proportions of paw size to leg diameter. A further object of the invention is to provide a boot which is substantially non-slip with respect to a surface the dog is traversing. Yet another object of the invention is to provide a more readily produced boot which is not unnecessarily complex or expensive to produce, and yet which is durable. An even further object of the invention is that the boot float for water usage. Another object of the invention is that the boot not unduly abrade the dog during use.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
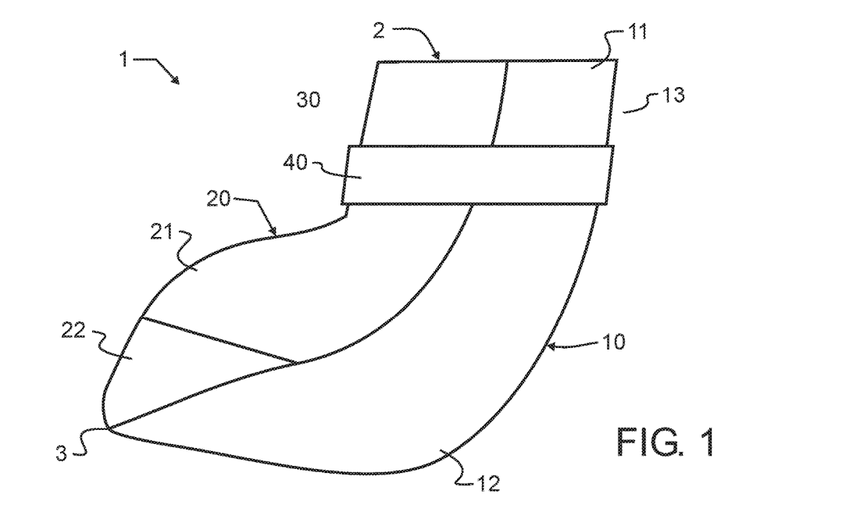
FIG. 1 illustrates a preferred embodiment dog boot designed in accord with the teachings of the present invention from a side plan view, in an operative or worn position, without illustrating the dog's leg.

Manifested in the preferred embodiment boot 1, the present invention fulfills the objectives set forth herein above and others. As shown in FIG. 1, boot 1 has the appearance of a flexible or somewhat flaccid tube, with a closed end 3 adjacent toe protective patch 22 and an open end 2 distal therefrom. Boot 1 includes a bottom 10 having a non-slip ground-engaging surface 12. In the preferred embodiment boot 1, the rear or bottom of the boot is covered from closed end 3 up to straps 30, 40 with this material, though it will be understood that surface 12 may be of any size, and so may comprise a small pad on bottom 10, or may be omitted completely. This non-slip ground-engaging surface 12 will most preferably be a material which is durable having good traction and pliability even at very low temperatures, and which is non-slip. One exemplary material is a PVC based thermoplastic formulation. Ground-engaging surface 12 could be Cordura, other nylon or any material that would have a specific feature such as traction, durability, or waterproofing that the designer elects to incorporate in a boot. However, the non-slip characteristic is most preferable, so as to enable a dog to comfortably stand on relatively slippery surfaces such as finished wood, ice or the like.

A second layer of material 11 may either extend from or be parallel to and continue beyond surface 12, or, when surface 12 is completely omitted, instead of surface 12. Material 11 will most preferably be relatively soft, compliant, durable, strong, and resistant to the elements. Standard nylon, ballistic nylon, or Cordura™ is most preferred for this substrate, owing to the inherent durability, ready fabrication, and permeability to gasses, while still providing some water resistance. In the preferred embodiment, material 11 extends from toe 17 to flare terminations 16, and is laminated with surface 12 by simple edge stitching.

A similar material will also be used in the fabrication of boot top 20, as material 21. With somewhat larger exposed surface area, the breathable nature of a woven or non-woven fabric will be very beneficial in many applications. A protective patch 22 will preferably be laminated with material 21. As shown in the preferred embodiment boot 1, protective patch 22 serves as a toe patch, which is particularly beneficial when a dog, for whatever reason, has a tendency to drag the toe. Protective patch 22 will help prevent serious damage to boot 1 as well as to the dog's foot. This patch in the preferred embodiment is preferably a stronger, more abrasion resistant material, and so may be Cordura™ or ballistic nylon, or other relatively more abrasion resistant material. Waterproofing may also be applied, if desired.

Strap 30, which is relatively close to the open end 2 of boot 1, would potentially slip above open end 2, and so become less effective. To prevent such slippage from occurring, a small closed loop 13 is provided at the top back of boot 1, adjacent open end 2. While in the preferred embodiment, only strap 30 passes through loop 13, it will be recognized by those skilled in the art that both straps 30 and 40 could pass through. Nevertheless, in the preferred embodiment boot 1, the operation of strap 40 is not as well suited to passing through loop 13, and so, in the preferred embodiment and subject to review for each new design incorporating the present invention, it does not do so.

Figure 2:
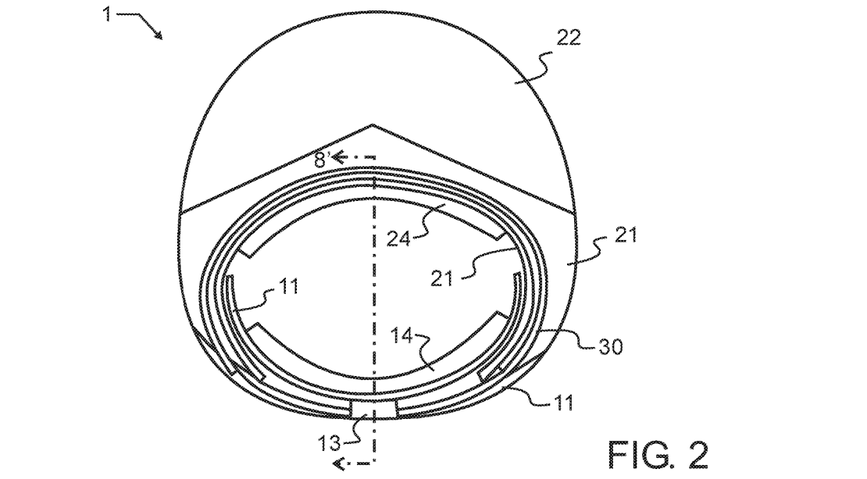
FIG. 2 illustrates the preferred embodiment dog boot of FIG. 1 from a top view looking down into the boot.

FIG. 2 illustrates preferred embodiment boot 1 from a top view, showing the relationship of the various boot components. As illustrated, top and front layer 21 may readily encompass bottom and back layer 11 adjacent the open end 2 of boot 1. Cushioning pads 14, 24 will most preferably extend on an inside of the respective layers of material 11, 21, within a circumference of contraction created by straps 30, 40 when these straps are tightened about the leg of a dog. In practice, these cushioning pads 14, 24 prevent undesirable constriction of a dog's leg, while at the same time forming a relatively high friction contact with the dog's leg, to help to ensure that boot 1 does not slip off. Noteworthy here is the fact that Cordura™ and ordinary nylons are generally relatively slippery, though these same materials are very durable and desirable for their intrinsic durability. Consequently, to use a durable and flexible nylon without the present synergy of the higher friction pads will result in the boots sliding from the dog's legs. These cushioning pads 14, 24 will also ensure a relatively complete surface contact with an otherwise non-cylindrical leg, which also helps to ensure even force distribution about the entire circumference of contraction formed by straps 30, 40.

Most preferably, boot 1 will be dimensioned to cooperate with the intrinsic geometry of a dog paw. In this regard, it is noted that most dog paws are slightly wider at the pad than they are in the leg region slightly above and immediately adjacent the pad. Consequently, with reasonable sizing and placement, cushioning pad 14 will be placed on the leg adjacent the dog's pad, and strap 40 will secure cushioning pad 14 in that position. Such placement ensures that the bulge at the dog's pad will produce interference with cushioning pad 14, thereby preventing cushioning pad 14 from sliding down into the dog's pad region.

Figure 8:
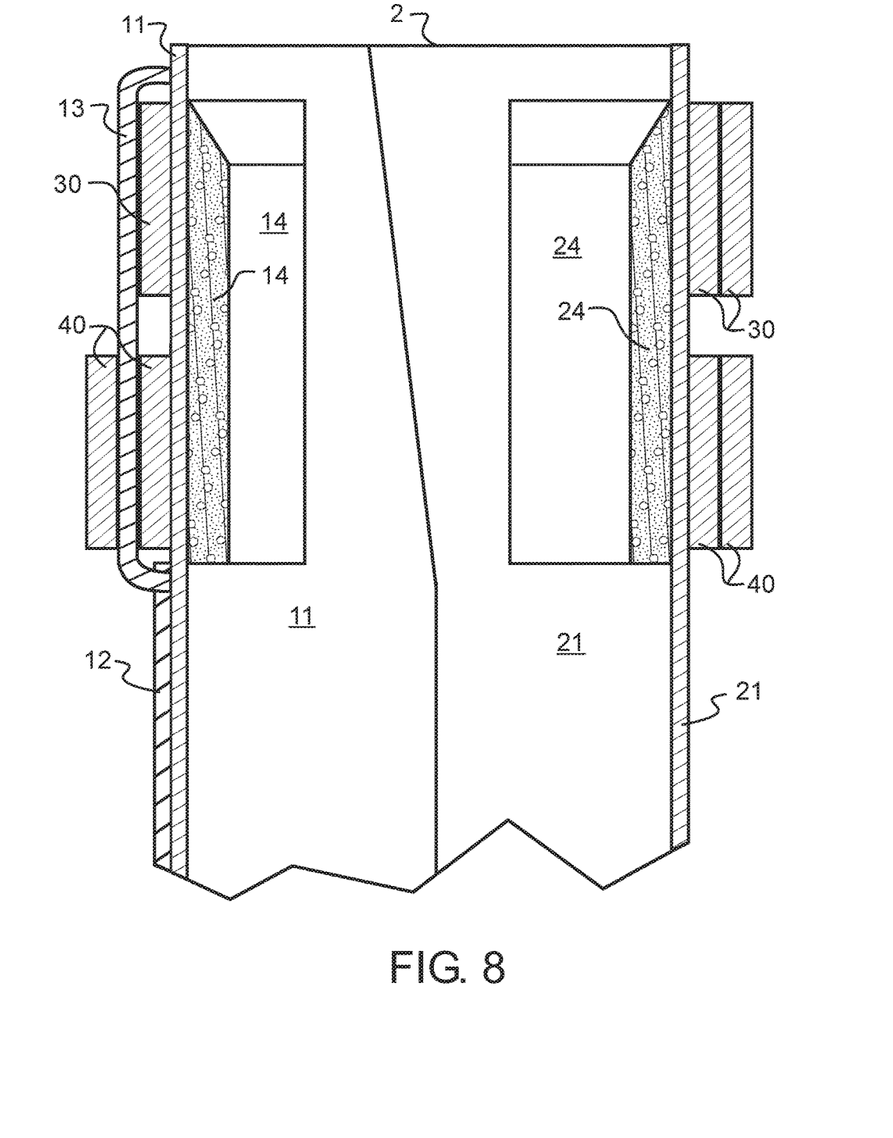
FIG. 8 illustrates the region of the preferred embodiment dog boot adjacent open end 2 by enlarged sectional view taken along line 8' shown in FIG. 2.

To further advance this effect, it is quite desirable to cut at least cushioning pad 14 and optionally cut cushioning pad 24 at different angles than perpendicular on edges adjacent open end 2, while keeping these edges perpendicular adjacent the dog's pad, as may be best viewed in the enlarged sectional view of FIG. 8. This permits the dog's paw to pass into boot 1 with less interference, while the sudden perpendicular edge at the base of cushioning pads 14, 24 creates interference.

In the most preferred embodiment, cushioning pads 14, 24 may comprise one or more of a variety of foams and foam rubbers, though closed cell polyurethane and neoprene are preferred, for their combination of low cost, ready availability, water resistance, and high coefficient of friction with many surfaces and materials. This latter coefficient of friction will help to ensure that boot 1 stays in place without requiring excessive forces be applied to straps 30, 40. In one exemplary and non-limiting alternative embodiment, another suitable material with similar characteristic is a silicone rubber, such as a low durometer RTV composition. In another alternative embodiment, a suitable material is a gel, whether formulated from silicone or other elastic, viscoelastic, elastomeric, or other composition.

Depending upon the relative friction between the dog leg and boot 1, other devices may be used which serve to contract open end 2. Such devices are too numerous to specifically mention herein, but can include elastic materials, and even resilient and elastic fabrics commonly found in the apparel industry.

Figure 3:
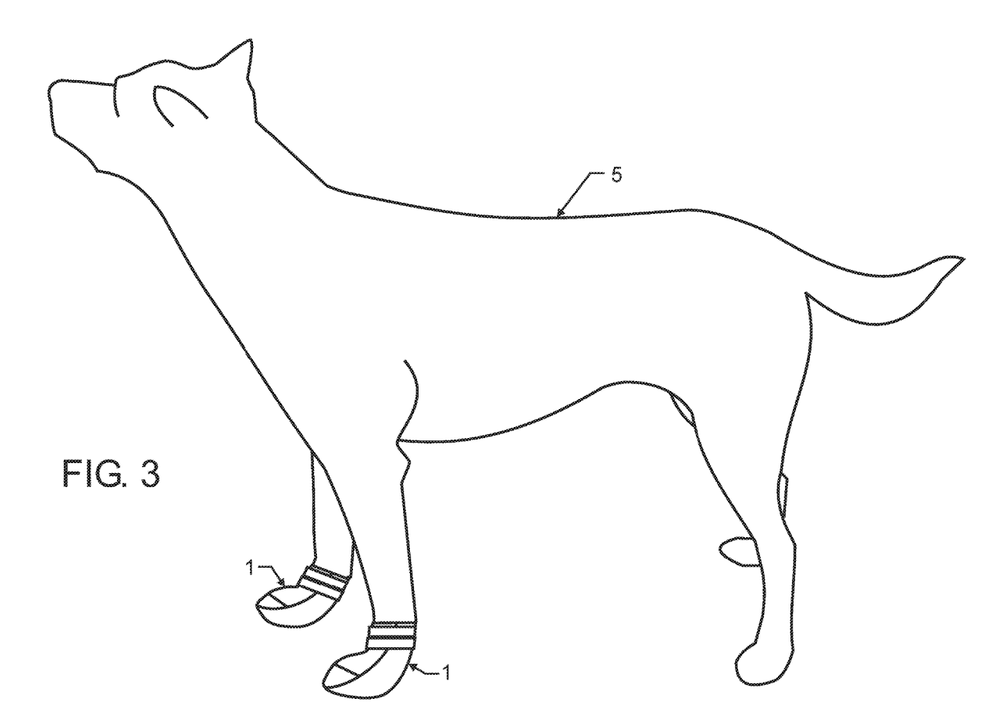
FIG. 3 illustrates the preferred embodiment dog boot of FIG. 1 from a side view, as placed upon the front paws of a dog.

FIG. 3 illustrates a pair of boots 1 affixed to the front legs and paws of an exemplary dog 5. While one pair of boots 1 are illustrated, it will be apparent that one or more boots 1 may be affixed to a dog, and that in many instances four boots will be affixed, one for each paw of dog 5.

Figures 4, 5:
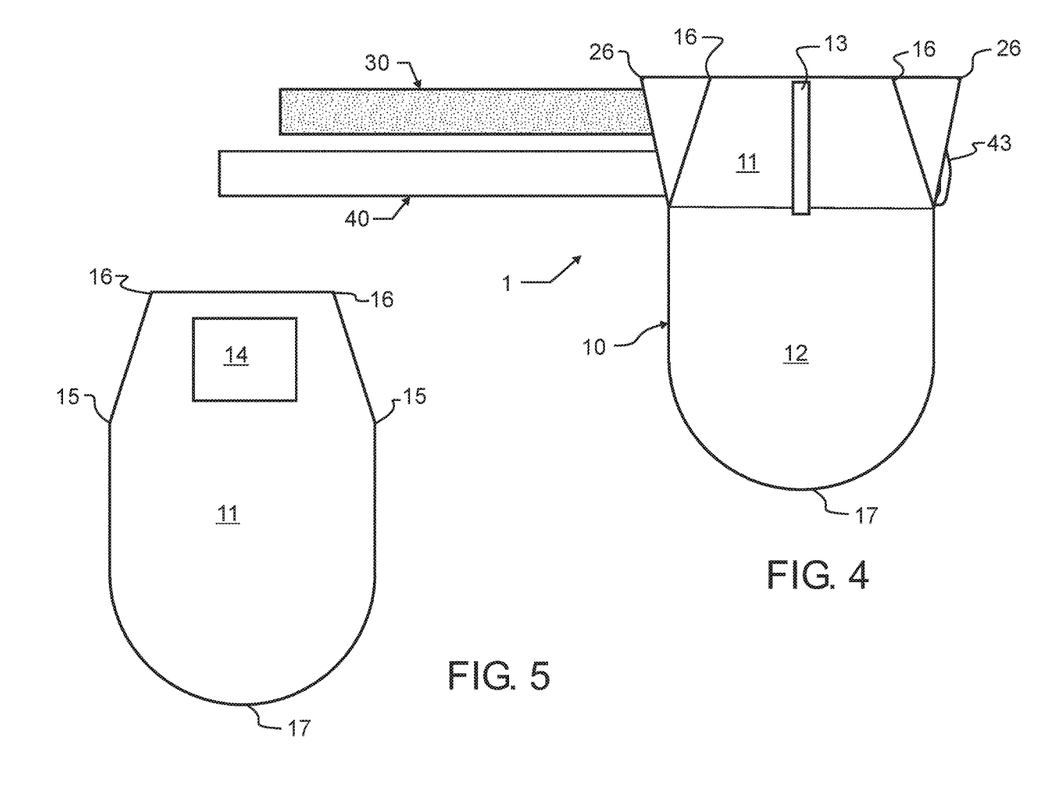
FIG. 4 illustrates the preferred embodiment dog boot of FIG. 1 from a bottom view with the boot laid flat, and the straps fully released.
FIG. 5 illustrates the preferred embodiment dog boot of FIG. 4 looking at the bottom of the boot, with the top removed as though inside the boot, from a top view.

FIG. 4 illustrates preferred embodiment boot 1 laid out flat, from a bottom view, as it will typically be after manufacture but before being placed on a dog's leg. Straps 30 and 40 are extending from boot 1, rather than being in the operative, wrapped position shown in FIGS. 1 and 2.

FIG. 5 illustrates boot 1 showing only bottom 10, looking at the side of bottom 10 opposed to that shown in FIG. 4. FIG. 5 shows the relative size and placement of cushioning pad 14. FIG. 5 also illustrates the overall shape and geometry of bottom 10, which is that generally of a rectangle, but with two significant changes. First, adjacent closed end 3, the ninety degree corners that would be found in a standard rectangle have been chamfered, to yield a relatively rounded toe end 17. Those skilled in the art will recognize that the final amount of chamfer or other shaping will depend upon the paw print for which the boot 1 is intended. A good universal shape is the gradual arc formed by extensive chamfer as shown in the present figures.

Opposite to toe end 17 there is a flare which begins at points 15 and narrows with increasing distance from toe end 17 and closed end 3 to flare terminations 16.

In contrast, the top and front 20 has an opposite flare which widens with increasing distance from toe end 17 and closed end 3 to end points 26, and also includes the chamfer adjacent closed end 3 which forms rounded toe end 27. Cushioning pad 24 will still most preferably be placed adjacent to straps 30, 40, but will, like cushioning pad 14, not extend the full width of the rectangular shape of top and front 20.

Boot 1 consists of both top and front 20 and bottom 10. In the preferred embodiment, these two components are assembled by stitching at a perimeter therebetween, though many other known manufacturing equivalents exist and are contemplated herein, including for exemplary purposes only and not limited thereto, thermal bonding, chemical bonding, and adhesive bonding.

Rather than stitching the entire perimeter, which would fully close boot 1, stitching will stop at points 15, and not extend beyond toward flare terminations 16. This means that two opposed slits have been formed adjacent flare terminations 16, most preferably in the region over which straps 30, 40 travel. The slits thus formed provide overlap without bunching, and the fact that cushioning pads 14, 24 do not form an entire circumference means that straps 30, 40 may be tightened about a wider range of dog legs without any fear of bunching than was possible in the prior art. Yet, and as aforementioned, cushioning pads 14, 24 will ensure good contact with a dog's leg. The shapes illustrated in FIGS. 4-7 also allow preferred embodiment boot 1 to easily slip onto a dog's foot, as the opening is quite wide at the top of the boot when the slits are opened.

Preferred embodiment boot 1 as illustrated in FIG. 2 provides two opposed cushioning pads 14, 24 that together wrap incompletely about the dog leg. In an alternative embodiment, only one of the two opposed cushioning pads 14, 24 is provided, and the two opposed slits are dimensioned as in the preferred embodiment so as to not allow overlap between either top and front layer or bottom and back layer 11 and the cushioning pad. As may be apparent from FIG. 2, the edge of cushion 14 provides sufficient elevation to ensure a relative nesting of the edge of the front layer 21 adjacent thereto, preventing disruption of circulation within a dog's leg.

Figures 6, 7:
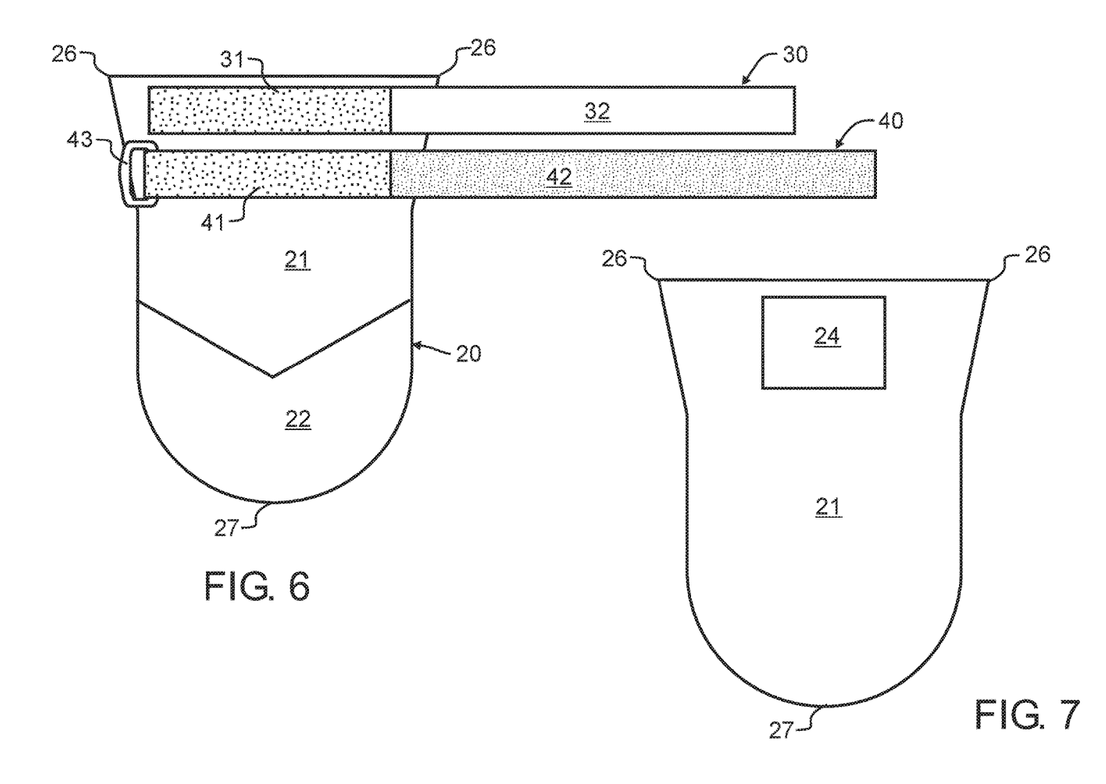
FIG. 6 illustrates the preferred embodiment dog boot of FIG. 1 from a top view with the boot laid flat, and the straps fully released.
FIG. 7 illustrates the preferred embodiment dog boot of FIG. 6 looking at the top of the boot, with the bottom removed as though inside the boot, from a bottom view.

By using closed cell foam for cushioning pads 14, 24, boot 1 has the ability to float in water, which is an advantage when a boot comes off the dog in water. Unfortunately, the effects of water, muck and the like may still exert forces that are greater than the boot can otherwise resist. Hook and loop fasteners or a similar product are used to make up the fastening system comprised by straps 30, 40. The top strap 30 is a simple hook and loop fastening system preferably placed near the top of boot 1. The bottom strap 40 uses a plastic loop 43 to increase leverage and holding power. Strap 40 goes around the back of boot 1, through loop 43, and reverses direction to come back to the front of boot 1. This allows a person to use leverage when tightening strap 40. This strap 40, along with cushions 14, 24 underneath straps 30, 40, ensures boot 1 will stay on the dog under the most severe conditions, including but not limited to mud, water, snow, heavy brush and the like. FIG. 6 illustrates the hook portions 31 and 41 of straps 30, 40, and the loop portions 32, 42 which are designed to inter-engage and fasten together, though it will be understood that these arrangements of hooks and loops are not critical to performance.

Figure 9:
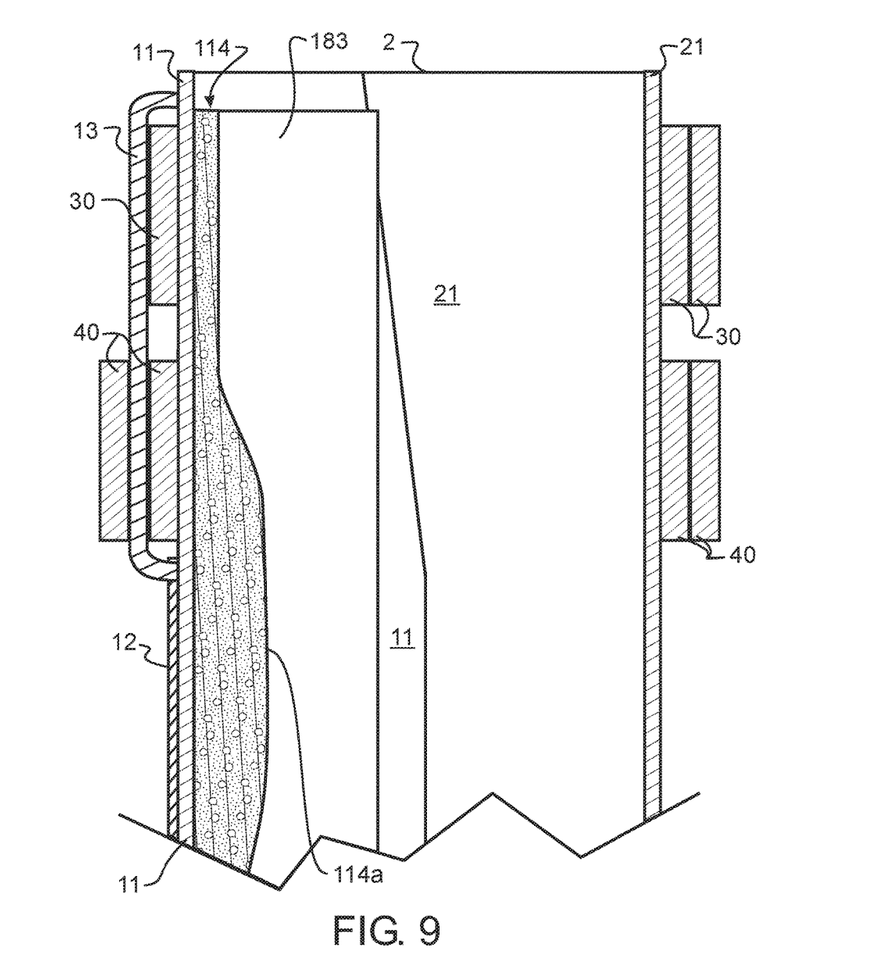
FIG. 9 illustrates a first alternative embodiment of the region of the preferred embodiment dog boot adjacent open end 2 by enlarged sectional view similar to that of FIG. 8, as though taken along line 8' shown in FIG. 2.
Figures 10, 11:
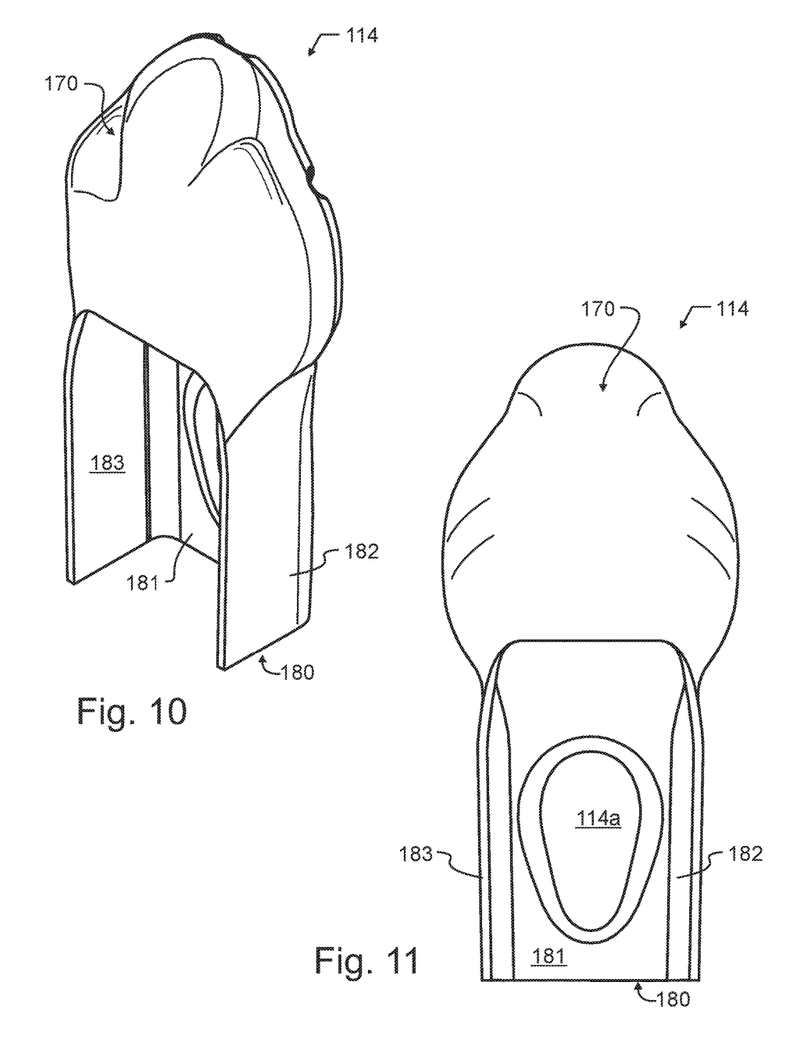
FIG. 10 illustrates the alternative embodiment foam liner used in the first alternative embodiment dog boot of FIG. 9 from a projected view.
FIG. 11 illustrates the alternative embodiment foam liner of FIG. 10 from a top plan view.

In a further alternative embodiment illustrated for exemplary purposes in FIG. 9, a single rear cushioning pad 114*a* is a part of a single molded liner 114. In this exemplary alternative embodiment, a liner 114 such as illustrated in FIGS. 10 and 11 is molded in a single operation. Suitable materials may include those listed herein above with regard to cushioning pad 14, and will in most embodiments comprise a molded foam having an elastomeric property.

Alternative embodiment foam liner 114 in some embodiments will be inserted within and affixed to boot bottom 10 or boot top 20, such as by sewing, by adhesive, hook-and-loop, or other suitable permanent or removable fastener, or other technique selected from the myriad of known fastening techniques. In other embodiments, foam liner 114 may be formed directly onto boot bottom 10 through an overmolding process. In yet further embodiments, foam liner 114 may simply be inserted within open end 2 of boot 1, and may be removable therefrom such as for replacement or particular fitting to a dog.

When liner 114 is overmolded onto boot bottom 10, the labor required for assembly of a boot may be reduced. However, if liner 114 is separable from boot bottom 10, a boot so fabricated may be customized either at a factory or by a purchaser to provide an optimum placement of protruding pad 114*a*. In one embodiment, this may be achieved by providing several liners 114, each with a different placement of protruding pad 114*a*. One liner 114 may locate protruding pad 114*a* more nearly adjacent to a dog's metatarsal or metacarpal pad, or in other words more nearly adjacent to non-slip ground-engaging surface 12, while another may locate this same raised protrusion farther therefrom. In further alternative embodiments, in addition to varying the location of protruding pad 114*a*, the size or geometry of protruding pad 114*a* may also be varied. For exemplary purposes only, and not solely limiting the present invention thereto, this customization of liner 114 may permit a boot such as boot 1 fabricated therefrom to be custom sized, either for a particular dog breed or even to a particular dog. In such cases, the number of molds required for the molded sole will be few, and more of the generally less expensive and often longer lasting molds used to form a lighter, more foraminous or foamed liner 114 may be fabricated.

The combination of a higher density bottom 10 with a lower density liner 114 offers several additional benefits. A high density material used in boot bottom 10 may be selected to be much more durable, puncture resistant, and have other desirable characteristics than could be achieved with a lower density material. However, boot 1 will preferably be fabricated from a sufficiently low overall density so as to float if dropped into water. A boot 1 having only a high density boot bottom 10 may not float, but when combined with a low density liner 114, it will float.

A lower density liner 114 may also offer custom shaping under load that better conforms to a dog's foot, and so is more comfortable for the dog. For longer walks such as may be required on trails or in the case of service dogs, this better conformance and additional cushioning may help to ensure the dog may continue to fulfill the valuable service role.

In addition, the combination high density boot bottom 10 and low density liner 114 will also tend to transmit less thermally energy, thereby better protecting the dog's paws from both hot and cold surfaces than could otherwise be achieved with only a single density material having adequate durability to be worn as an exterior layer.

FIGS. 10 and 11 illustrate liner 114, without the other boot components. As may be apparent, liner 114 will most preferably have a geometry that corresponds to the interior of boot 1, and so may fit will therein. While liner 114 is illustrated as having full-height side walls 182, 183 formed in foam liner upper 180, extending entirely from the end of liner back surface 181 distal to optional paw cap 170, it will be appreciated that such side walls may undesirably buckle when liner upper 180 is raised to an angle relative to paw cap 170, which will occur when inserted into boot 1 and then placed on a dog's paw. To prevent such buckling, liner 114 may either be fabricated with notches or cut-outs removing portions of the liner first and second side walls 182, 183 in the vicinity of paw cap 170, or such notches or cut-outs may be formed through a post-molding operation.

Where liner 114 is sufficiently durable and also rigidly or preferably permanently affixed with boot bottom 10, then this can simplify a sewing operation to secure protruding pad 114*a* in the proper place. As evident in FIG. 9, the material is thinner in liner back surface 181 and liner first and second sides 182, 183 than in protruding pad 114*a*. Since the sewing may be arranged to pass through liner 114 in these thinner regions separate from protruding pad 114*a*, the stitches will pass through less of the elastomeric or rubber material.

While liner 114 is illustrated in FIGS. 9-11 as being fabricated in entirety from a foam material, in some further alternative embodiments liner 114 may be fabricated from other materials such as fabric or the like, and protruding pad 114*a* may be adhered or molded thereto. In such case, liner back surface 181 and first and second sides 182, 183 may be substantially thinner, thereby not materially altering the inside diameter of the tubular body defined by boot 1.

As may be understood, these preferred embodiment booties have many uses, including keeping a dog's feet clean when outside, to protect hunting dog's feet from thorns and burrs, and, when walking them, to protect dog's feet from chemicals and severe cold in the winter, and severe heat in the summer. Additionally, while the preferred embodiment describes application to dogs in accord with the requirement for enablement, those skilled in animal husbandry will recognize that the present invention will have application to other animals having similar paw and leg anatomy. Consequently, while the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

We claim:

1. A dog boot, suitable for insertion and removal of a dog's leg and paw and operatively providing protective covering about said dog paw, comprising:

an operatively protective covering having a toe end and an open end and defining a dog paw region operative to surround said dog's paw, and defining a dog leg region operative to surround said dog's leg, said dog paw region located adjacent to said toe end and having a ground engaging surface, said dog leg region located adjacent to said open end;

a means for contracting said dog leg region; and an elastomeric liner having a base defining at least a part of said dog leg region and having at least one interference-producing cushion protruding from said elastomeric liner base, said at least one interference producing cushion located on an interior of said dog leg region and having first and second generally opposed major surfaces separated by a thickness of said cushion, said first major surface affixed to said elastomeric liner base and said second major surface separated from said elastomeric liner base by said cushion thickness and protruding interiorly from said operatively protective covering above and immediately adjacent to said dog paw region ground engaging surface operative to produce interference with said dog's paw and thereby resist said dog leg region sliding into contact with said dog's paw.

2. The dog boot of claim 1, wherein said at least one interference-producing cushion further comprises a termination distal to said open end, said at least one interference-producing cushion located entirely within said dog leg region.

3. The dog boot of claim 1, wherein said at least one interference-producing cushion further comprises a tapered edge most nearly adjacent to said open end which slopes simultaneously away from said open end and away from said operatively protective covering, thereby facilitating insertion of a dog's paw into said dog boot.

4. The dog boot of claim 1, wherein said at least one interference-producing cushion further comprises a foam pad.

5. The dog boot of claim 1, wherein said at least one interference-producing cushion further comprises elastic material.

6. The dog boot of claim 1, wherein said at least one interference-producing cushion wraps less than the entire circumference of said dog leg region.

7. The dog boot of claim 1, wherein said operatively protective covering further comprises a front layer and a back layer, and said at least one interference-producing cushion extends less circumferentially than said back layer.

\* \* \* \* \*